United States Patent Office 2,954,217
Patented Sept. 27, 1960

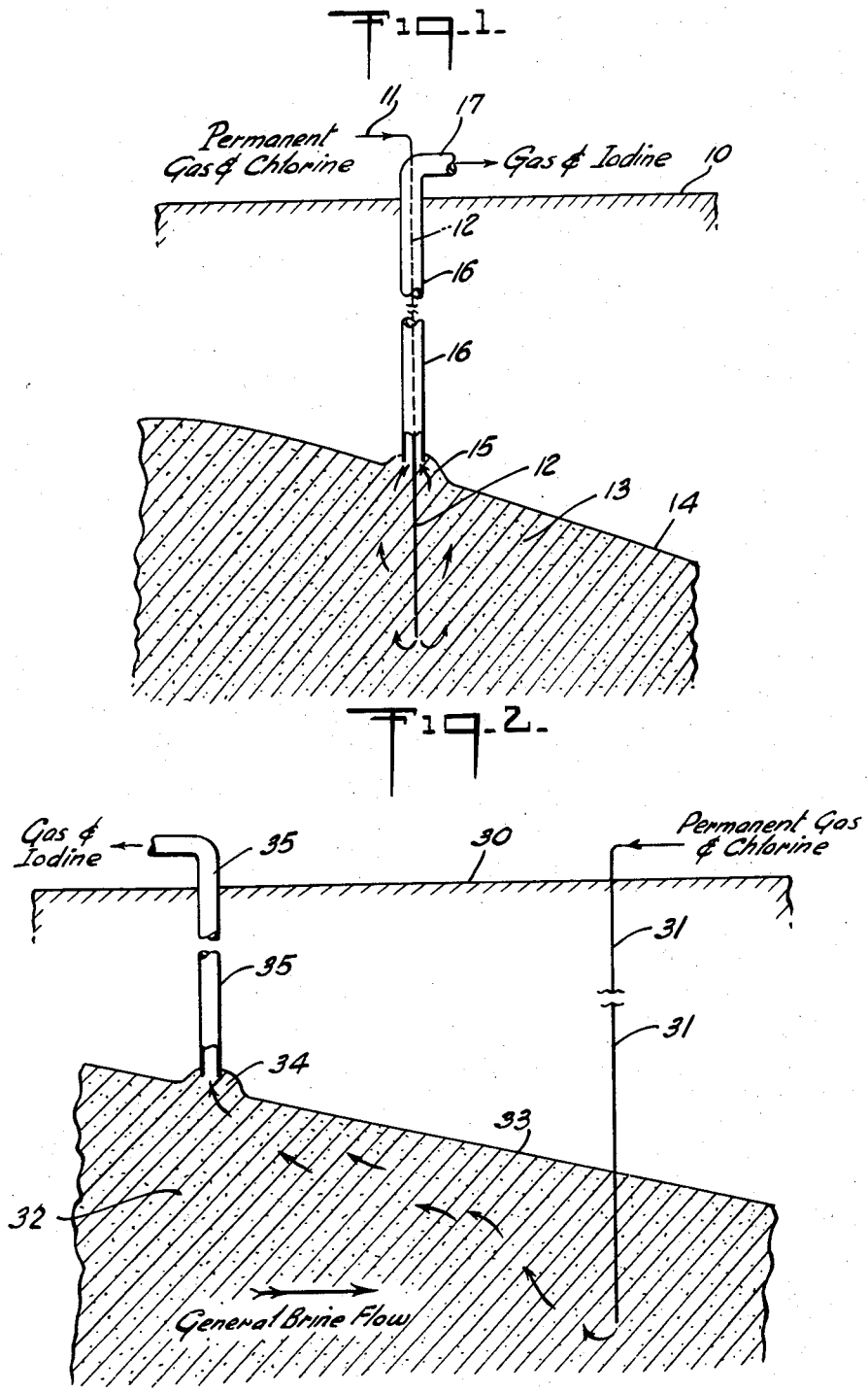

2,954,217

IODINE EXTRACTION FROM UNDERGROUND WATERS

Joseph C. Allen, Bellaire, Tex., assignor to Texaco Inc., a corporation of Delaware Filed Dec. 30, 1957, Ser. No. 705,833

3 Claims. (Cl. 262—1)

This invention relates to a process for recovery of iodine from an iodine-containing brine in a subterranean formation permeable to fluids, e.g., a brine-containing permeable rock matrix, a cavern substantially filled with brine, or the like. The commonest type of brines useful for the practice of this invention have been characterized as "oil field brines," and they can have as much as 10 to 135 parts per million iodine in them.

The process of this invention provides an improved method for removing the iodine from the brine because it completely eliminates brine cleanup, barium precipitation, and associated large scale spent brine disposal problems, and it minimizes corrosion problems; in one aspect the invention process eliminates the finishing stage, and the absorption and reduction steps of the air-blowing and the recovery stage. Other advantages of my process include elimination of investment in expensive brine handling, towers, and auxiliary equipment and, particularly when natural gas is used as the stripping gas, the process can be used in conjunction with pressuring a formation for oil production or the like.

My process is one for recovery of iodine from a natural body of an iodine-containing brine in a permeable subterranean formation deep below the surface of the earth, and it comprises: injecting from the surface permanent carrier gas and gaseous elemental chlorine down into said formation from at least one injection station disposed for making contact between said brine and said injected gases, thereby reacting with iodine compounds in the brine and liberating and stripping elemental iodine from said brine which flows with carrier gas to a reception station spaced from the injection station, withdrawing effluent permanent gas containing associated elemental iodine up to the surface of the earth through an output well, and recovering said elemental iodine from said permanent gas at the surface.

The drawings are schematic elevations showing ways for operating my process. They do not include compressors, valves, fittings, etc. which, of course, will be supplied where necessary or desired.

The operation of the process can be intermittent or continuous. It can be operated at any desired pressure which naturally exists on the formation or which can be imposed without driving the brine away from the area of the injection station. The injection station can be one or more pipes preferably corrosion-resisting such as transite, rubber, Saran (polystyrene), rubber-lined, concrete-lined, etc.

The output well can be similarly constructed, but of course, it is positioned to remove gas to the exclusion of the brine from the formation. This can be done in a naturally existing gas trap of substantial volume such as a dome in the formation, or one artificially created. The injection station is advantageously disposed fairly deeply in the brine-bearing formation, e.g., 10 feet, or more if possible.

Heretofore recovery of iodine from subterranean brines has always been conducted as a surface operation. This necessitates pumping or otherwise getting the normally corrosive, dense brines up to the surface of the ground, collecting brines from various sources (normally using corrosion-resisting equipment), occasional concentration of the brine and three principal operating stages, namely, brine cleanup, iodine removal from the brine by gas blowing, and recovery of the iodine from the gas. A conventional process is described in Industrial and Engineering Chemistry, vol. 41, page 1547, 1949.

Brine cleanup involves separation of oil from the brine, removal of silt, barium, etc. by flocculation and pH adjustment, if necessary. The brine cleanup is necessary because spent dirty brine (after iodine removal) cannot be discharged into rivers, sewers, lakes, harbors or even ocean fishing grounds, etc. without causing serious and offensive pollution. Actually laws and regulations make it unlawful in certain localities to dump such brines into watercourses unless it is clarified by the usual cleanup process.

The air-blowing and recovery stage in such conventional process comprises oxidation of the brine with chlorine to liberate molecular iodine from iodide and iodine salts, countercurrent air blowing of the oxidized brine, absorption of the blown-out iodine from the air by an aqueous solution of hydrogen iodide and sulfuric acid, and reduction of the absorbed free iodine to hydrogen iodide by continuous addition of water and sulfur dioxide to the hydrogen iodide-sulfuric acid absorption liquor. The finishing operation involves oxidation of hydrogen iodide to iodine with chlorine; a portion of the hydrogen iodide from the sulfuric acid liquor is continuously let off to contact with chlorine with the resulting precipitation of crystalline iodine.

A pressure differential is maintained between the injection station and the output well or reception station which is maintained at a pressure sufficiently lower for inducing the gas flow from the injection station to the output well through the brine, preferably in a direction different from the flow of brine water in the subterranean formation (to assist in contacting the gas and liquid phases for most effective oxidation and stripping of iodine underground).

The operation appears to be most efficacious in regions where a tilted water table at an oil-water contact exists. Advantageously the average gross rate of flow of the underground brine water is at least about .01 gallon per square foot of the formation at the cross-section where the flow is occurring per second (which corresponds to roughly a tenth of a mile an hour average velocity in formations of porosity sufficient to have good gas and liquid permeability).

The permanent gases useful in stripping the iodine for my process include air, natural gas, hydrogen, carbon monoxide, carbon dioxide, flue gases and the like. Ordinarily they are inert, but in some instances an acid characteristic e.g., $CO_2$, can be helpful for recovery of the iodine. Broadly the concentration of chlorine mixed with natural gas for the practice of my process can be between about 1 and about 40 percent by volume and is advantageously between about 5 and about 25 percent by volume; when using air the chlorine concentration is advantageously about half or less that for natural gas operation.

While I prefer to introduce the chlorine into the formation mixed with the permanent gas I can, of course, introduce chlorine separately from the permanent gas in one or more injection stations, or I can inject the chlorine and the stripping gas sequentially from the same or different injection stations. By a permanent gas I mean a gas which will remain in the vapor state under the conditions of operation, that is, at temperatures from about −30° to +350° F., typically 158° F. in the formation, and under a pressure as high as 4500 p.s.i.g. In the preferred embodiment of my invention, the permanent gas used is natural gas, typically a gas containing paraffins preponderantly methane. A suitable natural gas, for example, contains 87.1% methane, 7.9% ethane, 2% propane, 1.9% nitrogen and 1.1% carbon dioxide. Another suitable natural gas contains 59.1% methane, 14.5% ethane, 1.3% nitrogen, and 25.1% carbon dioxide. Still another suitable natural gas contains 96% methane, 3.2% nitrogen, and 0.8% carbon dioxide (all by volume).

When air is the permanent gas used for stripping the iodine the pressure on the air is, preferably, just sufficient to drive the air through the formation from the injection station to the output well and thence to the surface of the ground. When using natural gas I prefer to inject the gas at a pressure of 3000 to 4500 p.s.i.g. (where the brine formation permits use of such pressure without badly dislocating the brine situs or flow), then to collect the effluent stripping gas bearing elemental iodine and any unreacted unabsorbed chlorine, and finally to recover the iodine from the effluent as a crystalline solid by expanding the effluent gas stream from the formation to a pressure between 500 and 1200 p.s.i.g. In the high pressure stripping phase of such operation the temperature is advantageously between about 60° and about 300° F. with a presssure of 3500 and 4000 p.s.i.g., and the expansion for iodine recovery is 800 to 1100 p.s.i.g. It is preferred to maintain natural gas/brine contact at 0.2–2 cubic feet (standard conditions) of natural gas per estimated cubic foot of brine being contacted with that gas. This feature of the process, namely, the high pressure natural gas vaporizing the iodine, followed by pressure reduction subliming solid iodine, is believed to be retrograde phenomena as taught in my Patent 2,676,092 of April 20, 1954.

Using air as the permanent gas in my process I prefer to withdraw the iodine-containing effluent gas from the formation, bring it to the surface, and pass it at atmospheric pressure countercurrently in a packed tower against a stream of water containing sulfur dioxide to induce the following reaction:

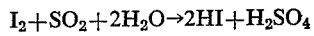

$$I_2 + SO_2 + 2H_2O \rightarrow 2HI + H_2SO_4$$

A portion of the hydrogen iodide-sulfuric acid liquor resulting is bled off and sent to the iodine finishing operations. The iodine-stripped air can be discharged to atmosphere or, advantageously, recycled to the injection station to pick up more iodine with additional, fresh elemental chlorine gas. Thus, the gas recycling, regardless of the type of permanent gas employed, avoids air pollution and the process is completely "clean" from this standpoint as well as from the brine standpoint.

In iodine finishing the hydrogen iodide-sulfuric acid liquor is treated with chlorine in suitable corrosion-resistant equipment whereby the following reaction takes place:

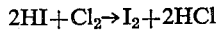

$$2HI + Cl_2 \rightarrow I_2 + 2HCl$$

The precipitated iodine is filtered from the resulting liquor, heated with sulfuric acid to char any residual organic impurities and to remove water, then the crude iodine is drawn off molten for solidification, crushing, and packaging.

In Figure 1 the injection station and output well are substantially concentric, with the former being located below the reception station at the bottom of the latter. The permanent (stripping) gas and chlorine are injected at inlet 11 and flow down pipe 12 into formation 13. Item 14 is the upper boundary of the brine-containing formation. The gases are dispersed from the bottom of pipe 12 and flow or rise upwardly through the brine in the formation (pipe 12 being grouted with cement to prevent short-circuiting of the gas about its outer periphery). Chlorine content of the injected gases is about 1 to 20% by volume based on the total volume of gas being injected into inlet 11. The carrier gas with associated iodine disengages from the formation and flows into and accumulates in gas trap 15 adjacent the reception station prior to being withdrawn to the surface of the earth. Trap 15 is made by underreaming the structure over the brine-containing formation. Thence it flows into output well 16 and upwards to outlet 17 for recovery of the iodine. The gas can be recycled after iodine has been recovered, or sent to other use, or flared. Item 10 represents ground level.

Figure 2 shows the preferred embodiment of my process. In this case item 30 represents ground level. A mixture of 85% by volume of the permanent gas (natural gas) and 15% by volume of gaseous chlorine are injected into pipe 31 thence down into the permeable brine-bearing formation 32 which is at about 4000 p.s.i.g. pressure and 160° F. temperature. In this instance the general brine flow is in the direction indicated by the tailed arrow, and it is counter to the flow of the gas from the injection station, which is the bottom of pipe 31, to output well 35. General flow of gas through the formation is upwardly through the brine to a reception station as indicated by the arrows without tails. Item 33 represents the upper boundary of the brine-bearing formation. The gas collects in and is withdrawn from gas trap 34 adjacent the reception station, then flows upwardly through output well 35 for discharge as gas and iodine and recovery of the iodine in a surface operation.

The high pressure iodine-containing gas stream obtained from well 35 is introduced into an expansion zone not shown wherein the pressure is reduced to about 1000 p.s.i.g. with the accompanying crystallization of iodine present in the gas stream. The iodine content of the gas stream is reduced to about ½ a gram per standard cubic foot (measured at 60° F. and one atmosphere total pressure) by the expansion of the gas stream and the accompanying temperature drop. The iodine deposited in the expansion zone, which advantageously contains ceramic packing, has a purity of approximately 99.8%. When the crystallized iodine substantially fills the expansion zone, the effluent gas from output well 35 is diverted to a second expansion zone wherein a similar iodine deposition occurs. Sublimed iodine from the first expansion zone is melted out of the first expansion zone to obtain the product and to fit the zone for reuse. The expanded effluent gas stream is recompressed with make-up chlorine for recycling to the injection station.

I claim:

1. A method for recovering iodine from a natural body of brine located in a permeable earth formation deep below the surface of the earth comprising injecting from said surface down into said formation at an injection station a mixture of gaseous chlorine and a carrier gas; providing a reception station spaced from said injection station and maintained at a sufficiently lower pressure than said injection station that gas flows from said injection station to said reception station through the brine in said formation, said chlorine reacting with iodine compounds in said brine to liberate iodine which flows with said carrier gas to said reception station; withdrawing carrier gas and associated iodine from said reception station up to the surface of the earth; and recovering said iodine from said carrier gas at said surface.

2. A method in accordance with claim 1 wherein said injection station is located below said reception station in said formation, and said carrier gas and chlorine rise through said brine.

3. A method in accordance with claim 1, also comprising providing a gas trap of substantial volume adjacent said reception station, said carrier gas and associated iodine accumulating therein prior to being withdrawn to the surface of the earth.

(References on following page)

References Cited in the file of this patent

UNITED STATES PATENTS

| | | |
|---|---|---|
| 1,433,956 | Knox | Oct. 31, 1922 |
| 1,494,735 | Cooper | May 20, 1924 |
| 2,140,183 | Bresler | Dec. 13, 1938 |
| 2,217,749 | Hewitt | Oct. 15, 1940 |
| 2,497,868 | Dalin | Feb. 21, 1950 |
| 2,676,092 | Allen | Apr. 20, 1954 |
| 2,708,481 | Allen | May 17, 1955 |
| 2,818,240 | Livingston | Dec. 31, 1957 |